United States Patent
Kotula

(10) Patent No.: US 7,983,779 B2
(45) Date of Patent: Jul. 19, 2011

(54) FAIL-TO-SAFE FAULT DETECTION SYSTEM FOR CONTINUOUS PRODUCTION LINE

(75) Inventor: David J. Kotula, Maple Plain, MN (US)

(73) Assignee: Sensors Integration, Maple Plain, MN (US)

( * ) Notice: Subject to any disclaimer, the term of this patent is extended or adjusted under 35 U.S.C. 154(b) by 229 days.

(21) Appl. No.: 12/207,856

(22) Filed: Sep. 10, 2008

(65) Prior Publication Data

US 2009/0187266 A1    Jul. 23, 2009

Related U.S. Application Data

(60) Provisional application No. 61/022,132, filed on Jan. 18, 2008.

(51) Int. Cl.
*G06F 19/00* (2006.01)
(52) U.S. Cl. ............. 700/110; 700/115; 702/82
(58) Field of Classification Search .......... 700/110, 700/115, 116; 702/82; 340/674; 235/375, 235/376, 385

See application file for complete search history.

(56) References Cited

U.S. PATENT DOCUMENTS

| | | | | |
|---|---|---|---|---|
| 5,841,661 A | * | 11/1998 | Buchanan et al. | 700/121 |
| 2003/0023882 A1 | | 1/2003 | Udom | |
| 2003/0176942 A1 | * | 9/2003 | Sleep et al. | 700/213 |

* cited by examiner

*Primary Examiner* — Ryan A Jarrett

(57) ABSTRACT

Some embodiments for a fault detection apparatus may include one or more monitors to detect at least three operating states of a sensor, such as pass, fail, and inoperative so as to enable a manufacturing facility to differentiate between situations in which a container does not have the appropriate machine readable label and situations wherein the sensor is actually inoperative. The fail state may be indicative of an object on a conveyor system not matching a predetermined description, identity or characteristic. The pass state may be indicative of an object on a conveyor system matching the predetermined description, identity or characteristic. The inoperative state may be indicative of a sensor output associated with a malfunction in the sensor itself. The fault detection apparatus may also include a fail-to-safe controller configured to detect these operating states.

33 Claims, 4 Drawing Sheets

FAIL-TO-SAFE FAULT DETECTION SYSTEM FOR CONTINUOUS PRODUCTION LINE

RELATED APPLICATION

This application claims the benefit of U.S. Provisional Application Ser. No. 61/022132, filed on Jan. 18, 2008 by David Kotula and entitled "Fault Detection," the entirety of which is hereby incorporated as if fully set forth herein.

BACKGROUND

Food processed in a manufacturing facility is highly controlled to ensure safe conditions for consumers. The dangers in manufactured food includes equipment falling into the food, bacterial or fungal contamination, and allergen contamination. The number of individuals particularly children with food allergies has increased dramatically in the last twenty years. Dairy and wheat are potentially deadly allergens common in processed foods. Even trace amounts of an allergen can cause health issues.

To combat this problem, manufacturers process non-allergen versions of their products. Separate manufacturing lines are often constructed to avoid any trace contamination. In the event of cross-contamination, however, hours or days of production may need to be recalled to prevent distribution of tainted food products.

SUMMARY

Some embodiments for a fault detection apparatus may include one or more monitors to detect at least three operating states of a sensor, such as pass, fail, and inoperative so as to enable a manufacturing facility to differentiate between situations in which a container does not have the appropriate machine readable label and situations wherein the sensor is actually inoperative. The fail state may be indicative of an object on a conveyor system not matching a predetermined description, identity or characteristic. The pass state may be indicative of an object on a conveyor system matching the predetermined description, identity or characteristic. The inoperative state may be indicative of a sensor output associated with a malfunction in the sensor itself. The fault detection apparatus may also include a fail-to-safe controller configured to detect these operating states. If the pass state is detected, the controller may transmit a pass signal to a conveyor control system. If the fail state is detected, the controller may transmit a fail signal. In preferred embodiments the fail signal is the default output of the controller. If the inoperative state is detected, the controller may transmit a fail signal and/or a signal indicating that the sensor needs maintenance.

In certain illustrative implementations, the fault detection apparatus may determine if an item does not match the current program set in the controller. For example, the first state may be triggered only for a specific nut-free package code. If that code is not detected, the controller may shut down the conveyor carrying the items or shunt the object to an area in which rejected items are collected. Furthermore, if the sensor is inoperative the controller may not only shunt the objects but also notify the conveyor control system (and thus the line operator) that the cause of the rejects is not mispackaging but rather an inoperative sensor.

DETAILED DESCRIPTION OF ILLUSTRATIVE IMPLEMENTATIONS

Figure 1:
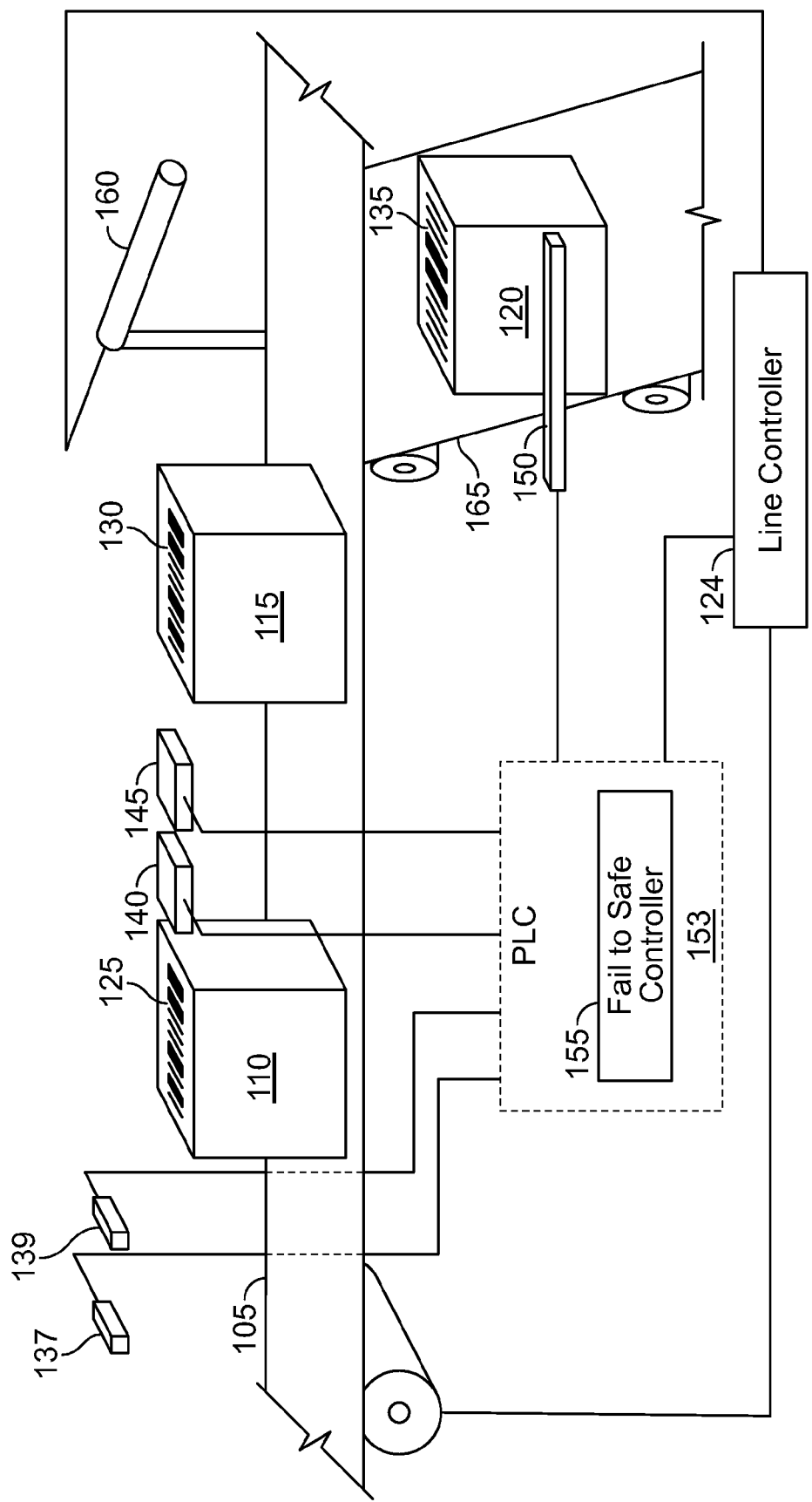
FIG. 1 shows an exemplary manufacturing system that includes a fail-to-safe system.

Food producers can reduce the risk of food allergies for consumers by implementing a product handing fail-to-safe system, such as an example fail-to-safe system 100 illustrated in FIG. 1. In general, fail-to-safe systems are systems that fail in a way such that no harm, or a minimum of harm, is caused to people or equipment.

In some embodiments, fail-to-safe systems may be configured using combinations of redundant inputs, outputs, feedback circuits, or combinations of these or other circuits. For example, a fail-to-safe system may be configured by using multiple parallel outputs to activate a circuit. A primary output may have one or more secondary outputs that achieve the same task as the primary output. If the primary output were to fail, the secondary output may still be able to activate the circuit. In another example, feedback circuits may be used to monitor an output. If the output fails, or the circuit fails to activate, the feedback circuit may be monitored to detect the failure and raise an alarm and/or initiate a shutdown.

In some embodiments, voting logic may be used to create a fail-to-safe system where redundant systems perform the same computation or measurement to determine a safe result. For example, two barcode scanners may be used to scan a single barcode. If the two scanners do not return a substantially identical result, the barcode may be rejected since there may be no way to determine which barcode scanner may have read the code correctly. In another example, three or more barcode scanners may be used to scan a single barcode. If a majority of the barcode scanners return a substantially identical result, the barcode may be accepted. One implementation of a barcode scanner can include a barcode scanner as described in the figures and description of U.S. patent application Ser. No. 10/283,781, filed on Oct. 30, 2002 by Long Xiang Bian et al. and entitled "Barcode Detection System," such figures and description being incorporated herein by reference.

In the example of the fail-to-safe system 100, a fail-to-safe configuration of equipment can reduce the risk of food allergens by implementing a redundant and fail-to-safe system to prevent allergenic food products from being intermixed with non-allergenic food products. The fail-to-safe system 100 can include a conveyor 105. The conveyor is controlled by a line controller 124. The conveyor 105 moves a number of items, such as an item 110, an item 115, and an item 120. In some embodiments, the items 110-120 may be food products, ingredients, chemical substances, or other items that may be defined as allergenic or non-allergenic. In some embodiments, the items 110-120 may be filled or empty packaging materials, boxes, cartons, tubes, cans, cylinders, or other items that can be used to contain items that may be defined as allergenic or non-allergenic.

The item 110 includes a code 125, the item 115 includes a code 130, and the item 120 includes a code 135. In some embodiments, the codes 125-135 may be alphanumeric characters, symbols, codes (e.g., bar codes, data matrix codes), colors, radio frequency identification (RFID) tags, magnetic stripes, or a combination of one or more of these and/or other codes that may be used to identify and/or classify an item. For example, the code 125 may be a code that may directly identify an item as being allergenic or non-allergenic. In another example, the code 125 may be a code that identifies the item 110, and the identity of the item 110 may be used to query a list or database of items to determine if the item 110 contains one or more allergens. In still other examples, the items 110-120 may carry multiple codes that identify multiple allergens.

The codes 125-135 are used to classify the items 110-120. In some embodiments, the items may be classified by their contents. For example, the codes 125 and 130 may indicate that the items 110 and 115 are free of wheat products, and the code 135 may indicate that the item 120 contains an allergen such as wheat.

The fail-to-safe system 100 includes a sensor 137, a sensor 139, a sensor 140, a sensor 145, and a sensor 150. In some embodiments, the sensors 137-139 can be configured to transmit a signal when the presence of an item, such as item 110, is detected on the conveyor at a position proximate the sensor 137-139. In some embodiments, the sensors 140-150 may be configured to detect alphanumeric characters, symbols, codes (e.g., bar codes, data matrix codes), colors, radio frequency identification (RFID) tags, magnetic stripes, or other codes that may be used to identify and/or classify an item. The sensors 140-150 are configured to scan the codes 125-135 to determine the classification of the items 110-120. For example, the sensors 140-150 may be configured to determine whether one or more of the items 110-120 are classified as containing an allergen, such as wheat or nuts.

In the illustrated example, the codes 125 and 130 indicate that the items 110 and 115 are free of one or more allergens, whereas the code 135 indicates that the item 120 contains an allergen. As the conveyor 105 moves, the items 110-120 are scanned by sensors 140 and 145.

The fail-to-safe system 100 receives outputs from the sensors 137-150. The sensor system 137-155 can have three or more outputs, providing information to classify an item. For example, one output provides information to the sensor system 137-155 that the item can be classified as a match, a second output can provide information to the sensor system 137-155 that the item is not a match, and a third output can provide information to the sensor system 137-155 that a malfunction has occurred in the sensor system 137-155. In some embodiments, a fourth output can be received to provide information regarding an item's reject status. In some embodiments, two outputs may be required to provide that two different codes on an item are both matches.

Likewise, each of the sensors 140 and 145 can report one of three states to a controller 155. The first state indicates that a sensed code (e.g., the code 125) is a positive read (e.g., matches an expected code). The second state indicates that a sensed code (e.g., the code 135) is a negative read (e.g., does not match an expected code). The third state indicates that no signal has been received (e.g., no read was performed).

The second state that the sensors 140 and 145 may provide can cause the controller 155 respond in one or more ways. In some implementations, the controller 155 may respond by sending a signal to the line controller 124 to reject each item that is not positively read. In other implementations, the controller 155 may send a signal to the line controller 124 to stop the conveyor when one or more of the sensors 140 and 145 reports the second state. In still other implementations, the controller 155 may count the number of negative reads that have been made by the sensors 140 and/or 145. For example, the fail-to-safe system 100 may send a signal to the line controller 124 to shut down the conveyor 105 after two, three, four, or more consecutive second state signals. In another example, the fail-to-safe system 100 may send a signal to the line controller 124 shut down the conveyor 105 if the ratio of negative to positive reads exceeds a threshold, for instance, a shutdown may be performed if three of the last five are negative.

The sensors 140-145 can transmit a signal to a buffer in the controller 155. For example, the buffer can receive an ASCII code to provide positive read information to indicate a match of an expected code. Likewise, the buffer can receive an ASCII code to receive a negative code, such as a code providing that an error has occurred within the sensors 140-145. In such a situation where the buffer is cleared and receives no new data after a set period of time, the controller 155 can determine that no signal has been received. For example, if one of the sensors 140-150 becomes disconnected and does not provide input, the buffer may have a default setting that the controller 155 is programmed to recognize as an error code. Alternatively, each time the buffer is refreshed, a signal can be triggered in the controller 155 that the buffer has refreshed. If the signal is not sent, the controller 155 can determine that a new sensor signal has not been provided. Likewise, a heartbeat signal, or signal to mimic the period of time expected between each container, can be used to determine if the register may be refreshed. In some implementations, the heartbeat signal can be provided to the controller 155. Similarly, an additional, redundant heartbeat signal can be sent to the controller 155. The controller 155 can provide a halt signal to the line controller 124 that the system 100 is not operating as configured. The line controller 155 can shut down the conveyor 105 or reject all items until the buffer is refreshed.

In some embodiments, the sensor 137 and the sensor 139 can each transmit a signal to the controller 155 that an item has been detected. The controller 155 can then transmit a signal to the sensor 140 to enable it to scan the item. Likewise, the sensor 145 can also be enabled to scan the item by receiving a signal from the controller 155. In some embodiments, the controller 155 can send the signal after a period of time, so that the item has time to travel to the sensor 140. Alternatively, the controller 155 can transmit the signal upon receiving the signal from the sensors 137-139 that the item has been detected.

In some embodiments, the controller 155 can send a signal if one sensor sends a signal that an item has been detected. For example, if sensor 137 detects an item, but sensor 139 does not transmit a signal that an item has been detected, the controller 155 can still transmit a signal to sensors 140-145 to scan the item. In some embodiments, the controller 155 can send a signal to the PLC 153 that the sensor 139 may be disabled, broken, or in need of repair.

In some embodiments, the controller 155 may signal an alarm. For example, an alarm may be signaled if one or more of the sensors 140-150 fails, if the conveyor 105 is stopped, if a rejected item is not sensed by the sensor 150, or for other events that may require an operator's attention. In some embodiments, an alarm may be indicated using a visual indicator (e.g., a semaphore, light tree).

The sensors 140 and 145 provide signals to classify the items 110-120. For example, the controller 155 may receive signals that indicate that both of the sensors 140 and 145 have positively read the code 130. The controller 155 responds by permitting the item 115 to continue down the conveyor 105. In examples where the controller 155 does not receive positive identification signals from both of the sensors 140 and 145, the fail-to-safe system 100 fails to safe and sends a signal to the line controller 124 to reject an item, such as the item 120. The controller 155 will only allow the items 110-125 to stay on the conveyor 105 if both of the sensors 140 and 145 have positively read the codes. A negative read by either or both of the sensors 140 and 145 will cause the system 100 to fail-to-safe and reject the offending item.

The fail-to-safe system 100 includes a diverter 160 and a reject path 165. In some embodiments, the diverter 160 may be an arm, blade, pusher, pneumatic blow-off, or other device that can be activated to divert an item, such as the item 135, off the conveyor 105 and onto the reject path 165. In another example, the controller 155 may receive signals that indicate that both of the sensors 140 and 145 have not positively read the code 135, indicating that the item 120 was not expected on the conveyor 105 and may contain an allergen. The controller 155 responds by sending a signal to the line controller 124 to activate the diverter 160 to redirect the item 135 onto the reject path 165.

The sensors 140 and 145 operate as a redundant, fail-to-safe pair. In some implementations, a positive identification of an item (e.g., the item 115) is made when the controller 155 detects that both of the sensors 140 and 145 have indicated that a positive read of the code 130 has been made. In some implementations, a negative identification can be made when the controller 155 receives signals from either or both of the sensors 140 and/or 145 that indicate that the code 130 was not positively read. For example, the code 130 may have been marginally identifiable. The marginal quality of the code 130 may cause sensor 140 to make a positive identification of the item 120 and the sensor 145 to make a negative identification the item 120. The controller 155 detects this discrepancy and responds by rejecting the item 120.

In some implementations, the controller 155 may detect that one or both of the sensors 140 and/or 145 have made no identification at all, and the controller 155 may respond by sending a signal to the line controller 124 to stop the conveyor 105. In some implementations, the controller 155 may respond to a failure of one of the sensors 140 or 145 by relying on the one active sensor and setting a service alarm to indicate that the failed sensor is in need of service.

Items, such as the item 135, on the reject path 165 pass by the sensor 150. As the item 135 moves past the sensor 150, the sensor 150 senses the code 135 and provides a detection signal to the controller 155. In some implementations, the controller 155 may use a signal from the sensor 150 to confirm that the item 120 has been removed from the conveyor 105. In some implementations, the controller 155 may detect that the sensor 150 has not detected the item 120 and send a signal to the line controller 124 stop the conveyor 105 until line operators can inspect the items 110-120 to ensure that an allergenic item is removed from the conveyor 105.

Although the fail-to-safe system 100 has been described in terms of identifying items 110-120 to detect allergenic products, other implementations may exist. In some implementations, the fail-to-safe system 100 may be used to identify items by make, model, brand, or other criteria that may be used to classify items. For example, a factory may use the conveyor 105 to produce similar products (e.g., frozen pizzas, canned vegetables, sodas) under two or more brand names. The fail-to-safe system 100 may be used to reject incorrectly branded products that have been detected on the conveyor 105.

In some implementations, the fail-to-safe system 100 may be used to identify items by size, quality, quantity, or other criteria that may be used to classify items. For example, the sensors 140 and 145 may be configured to perform and confirm visual inspections of the items 110-120 to perform counts (e.g., the number of pills in a blister pack), optical measurements (e.g., inspecting the prescription of lenses, counting the teeth on gears), or color measurements (e.g., to evaluate the quality of meats, to evaluate the ripeness of vegetables). In some implementations, the sensors 140 and 145 may be configured to perform and confirm other types of inspections. For example, the sensors 140 and 145 may detect metal in food products, the conductivity of an electrical circuit, the fidelity of a speaker, the viscosity of a liquid, or other qualities of the items 110-120 that may be detected with a sensor.

In some embodiments, if the controller 155 fails, the fail-to-safe system 100 can still fail safely. For example, the diverter 160 may be configured so that the item 110 will be allowed to continue along the conveyor 105 only when activated by the controller 124 receiving a signal from the controller 155 to do so. If the controller 155 fails, no signal is sent to activate the diverter 160, and the item 110 will be diverted to the reject path 165.

In some embodiments, the sensor system 137-155 can be bypassed so that if it is malfunctioning, the conveyor 105 can still run. For example, personnel can lock out the sensor system 137-155 and put the sensor system 137-155 into bypass mode so that the fail-to-safe behavior is no longer operational, but the items 110-120 still travel on the conveyor 105.

In some embodiments, the controller 155 may shut down the conveyor 105 using a relay. In some embodiments, the relay may include redundant contacts and/or multiple channels. For example, the relay may include multiple contacts so if one contact fails (e.g., welds, burns), another contact may still be used to stop the conveyor 105. In some embodiments, the relay may be monitored by the controller 155. For example, the controller 155 may send a first signal to activate the relay using a first relay channel, and the controller 155 may verify the activation of the relay by monitoring a second signal that is connected through a second relay channel.

In some embodiments, the configuration of one of the sensors 140-150 can be copied to a replacement sensor. For example, the sensors 140 and 145 may have a common configuration, and if one of the sensors 140 or 145 fails, a technician may be able to copy the common configuration from the remaining operational sensor to the replacement sensor.

In some implementations, a physical key to take the apparatus offline can be used. For example, the physical key can be used to put the system 100 into a bypass mode. In some implementations, the bypass mode can be initiated if the system 100 has a component failure. For example, if the controller 155 or one or more of the sensors 137-150 fails, the sensor system 137-155 can operate in bypass mode. As such, the conveyor 105 can continue to operate while a component undergoes maintenance or repair.

In some embodiments, the system 100 may include a semaphore (e.g., light tree). The semaphore may display various patterns of lights to indicate the state of the sensor system 137-155. For example, the semaphore may show a green light if the sensor system 137-155 is operating normally, or show a yellow light if the sensor 150 is blocked. The semaphore may indicate various alarm states. For example, the semaphore may blink a red light if an allergenic item has not been detected by the sensor 150.

In some embodiments, the sensor system 137-155 may include a semaphore and/or other visual indicators to provide a visual feedback when a line operator is configuring the sensor system 137-155. For example, the line operator may wish to reconfigure the sensors 140-155 to identify a new code. The line operator may turn a selector switch from a "RUN" position to a "TEACH" position, and the controller 155 may cause the semaphore to blink a green light to indicate that the "TEACH" mode is active. The line operator may present the new code to one or more of the sensors 140-150 to teach the new code to the sensors 140-150. The operator may have the option to confirm that the new code has been taught by presenting the new code to the sensors 140-150 a second time, and determine if the new code has been taught by observing the illumination of a green "match" indicator. If the new code was not taught, a red "no match" indicator may illuminate. The operator may turn the selector switch to the "RUN" mode, and the controller may respond by illuminating a steady green light.

In some embodiments, the controller 155 may log items 110-120 according to the time they are scanned. For example, a log can record the time an item is scanned and the state of the item. In some embodiments, the log can be transmitted to a server so that the log can be viewed from various locations. In some embodiments, the log can be viewed through a password-protected website. For example, if several controllers all upload logs to the server, a user can view rejects on multiple lines or analyze various changes in rejects over time.

In some embodiments, the semaphore may indicate the state of the sensor system 137-155 during a configuration process. For example, the semaphore may blink green when the system 100 has been set to a "teach" mode, display a steady red light when placed in a "bypass" mode.

Figure 2:
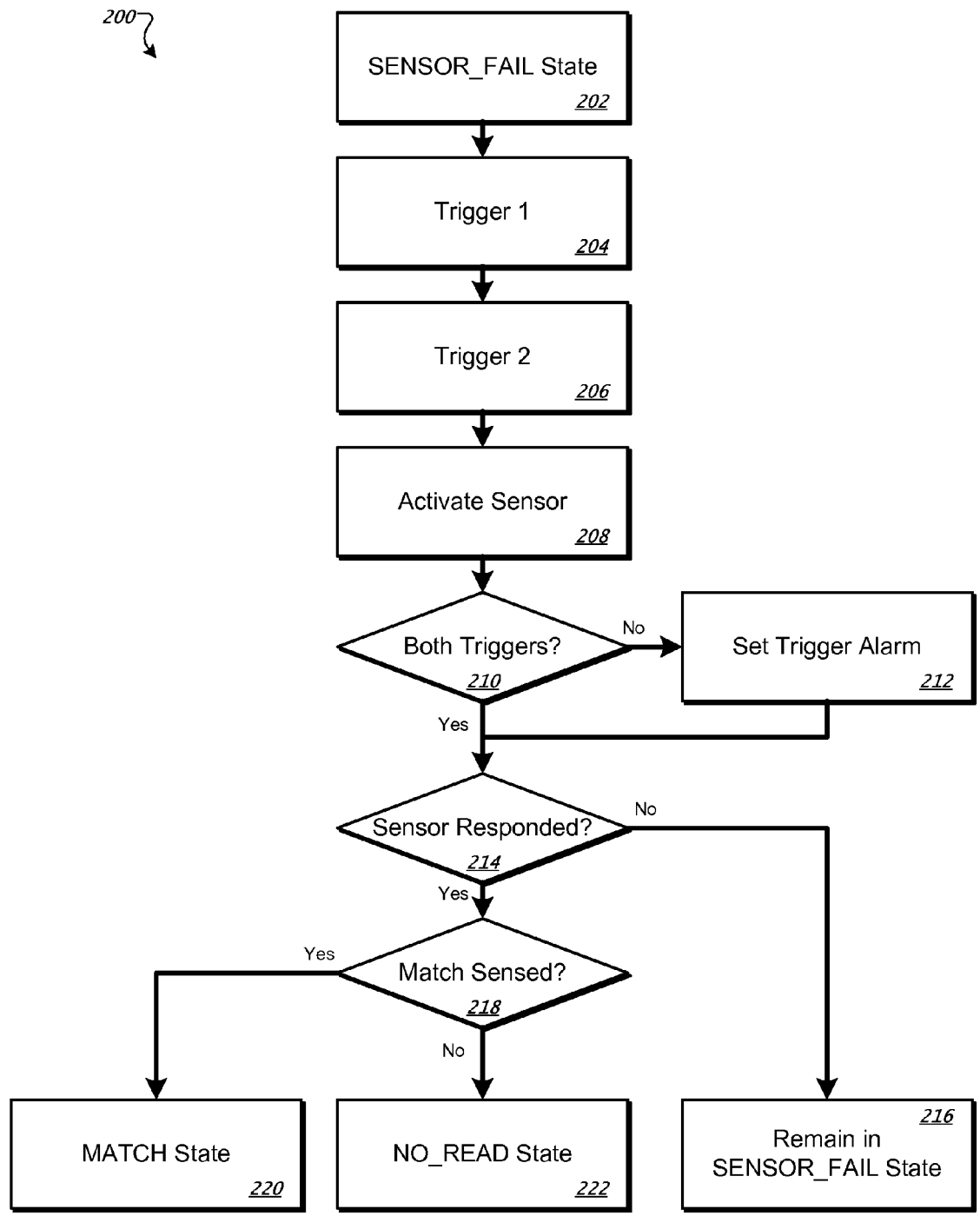
FIG. 2 shows an exemplary three-state sensor process for fail-to-safe code allergen detection.

FIG. 2 shows an example three-state sensor process 200 for fail-to-safe code detection. In general, the process assumes that a SENSOR_FAIL state exists (e.g., one or more sensors have failed) unless a signal from the sensor is detected. A functional sensor may respond with a signal that indicates that a code (e.g., the code 125 of FIG. 1) either matches an expected code, or that the sensor does not read an expected code. A code match will cause a MATCH state to be set, and no code read will cause a NO_READ state to be set. If no MATCH or NO_READ state has been set, then the SENSOR_FAIL state will remain set. This state can occur because of an actual sensor failure, or because the code does not match the expected code.

The process 200 starts when a SENSOR_FAIL is set (202). As an item (e.g., the item 110 of FIG. 1) moves down a conveyor (e.g., the conveyor 105), a first sensor (e.g., the sensor 137 of FIG. 1) is triggered (204), and a second sensor (e.g., the sensor 139 of FIG. 1) is triggered (206). In some embodiments, the first and second sensors 137-139 may be presence detectors. For example, the detectors may be break-beam detectors, photo-eyes, ultrasonic rangefinders, Hall-effect sensors, or other sensors that may be used to detect the presence of an item.

The first and second sensors 137-139 form a redundant pair. When either or both of the sensors 137-139 are triggered (204)-(206), a controller such as the controller 155 of FIG. 1 activates a third sensor (208) to sense a code (e.g., the code 125). In some embodiments, the third sensor may be a sensor that can identify a code(e.g., the sensor 140 of FIG. 1). In some embodiments, the controller 155 may increment a barcode cycle register when a trigger signal is detected.

If one of the first and/or second sensors 137-139 fails to trigger (210), then a trigger alarm is set (212). In some implementations, the trigger alarm may alert line operators that one of the sensors 137-139 may have malfunctioned and needs service. If the third sensor 140 does not respond (214) within a predetermined timeout period, then the SENSOR_FAIL state remains (216). In some embodiments, multiple successive sensor and/or trigger failures may trigger an alarm. For example, if the third sensor 140 fails to respond (214) for three successive items, an alarm may be set to cause a shutdown of the conveyor. In another example, an alarm may be set if three of the last five items did not cause the sensor 140 to respond (214).

If the third sensor 140 responds (214) within the predetermined timeout period, the response will indicate whether a match for the code has been made. If a match is sensed (218), then a MATCH state is set (220). If no read is sensed, then a NO_READ state is set (222).

In some embodiments, the SENSOR_FAIL, MATCH, and/or NO_READ states may be accompanied by visual indications for a line operator. For example, when a MATCH state is set (220), an output signal may be activated to illuminate a green "match" indicator. When a NO_READ state is set (222), an output signal may be activated to illuminate a red "no read" indicator.

In some embodiments, the process 200 may include a machine cycle counter. The machine cycle counter may be indexed whenever the process is started for an item. If the machine cycle count indexes and no trigger signal is sent to the controller, the SENSOR_FAIL state remains in effect and the item is rejected. In some implementations, rejecting items in response to a sensor failure may cause the process to continue without items on the conveyor 105.

Figure 3A:
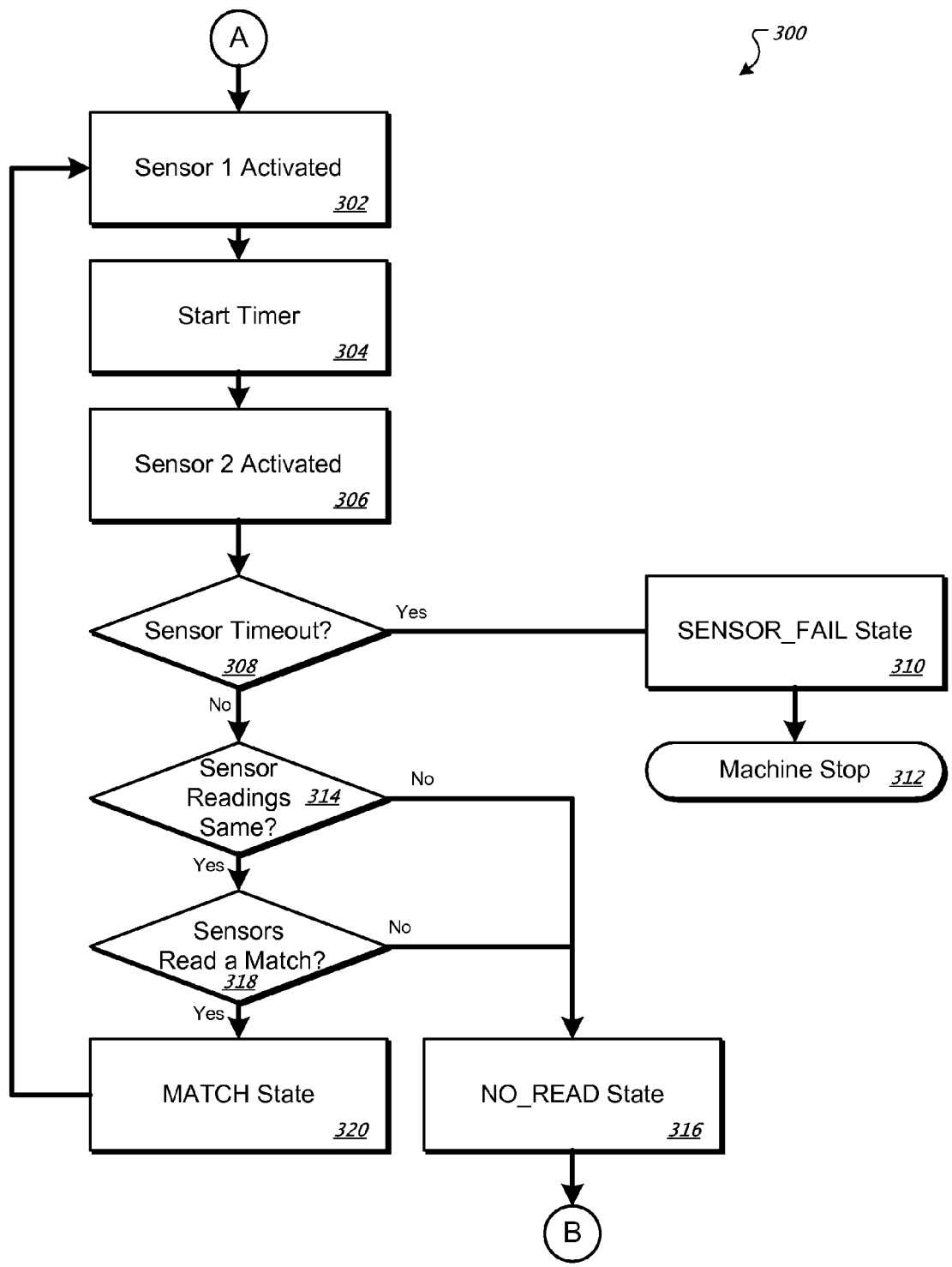
FIGS. 3A and 3B show an exemplary fail-to-safe inspection process.
Figure 3B:
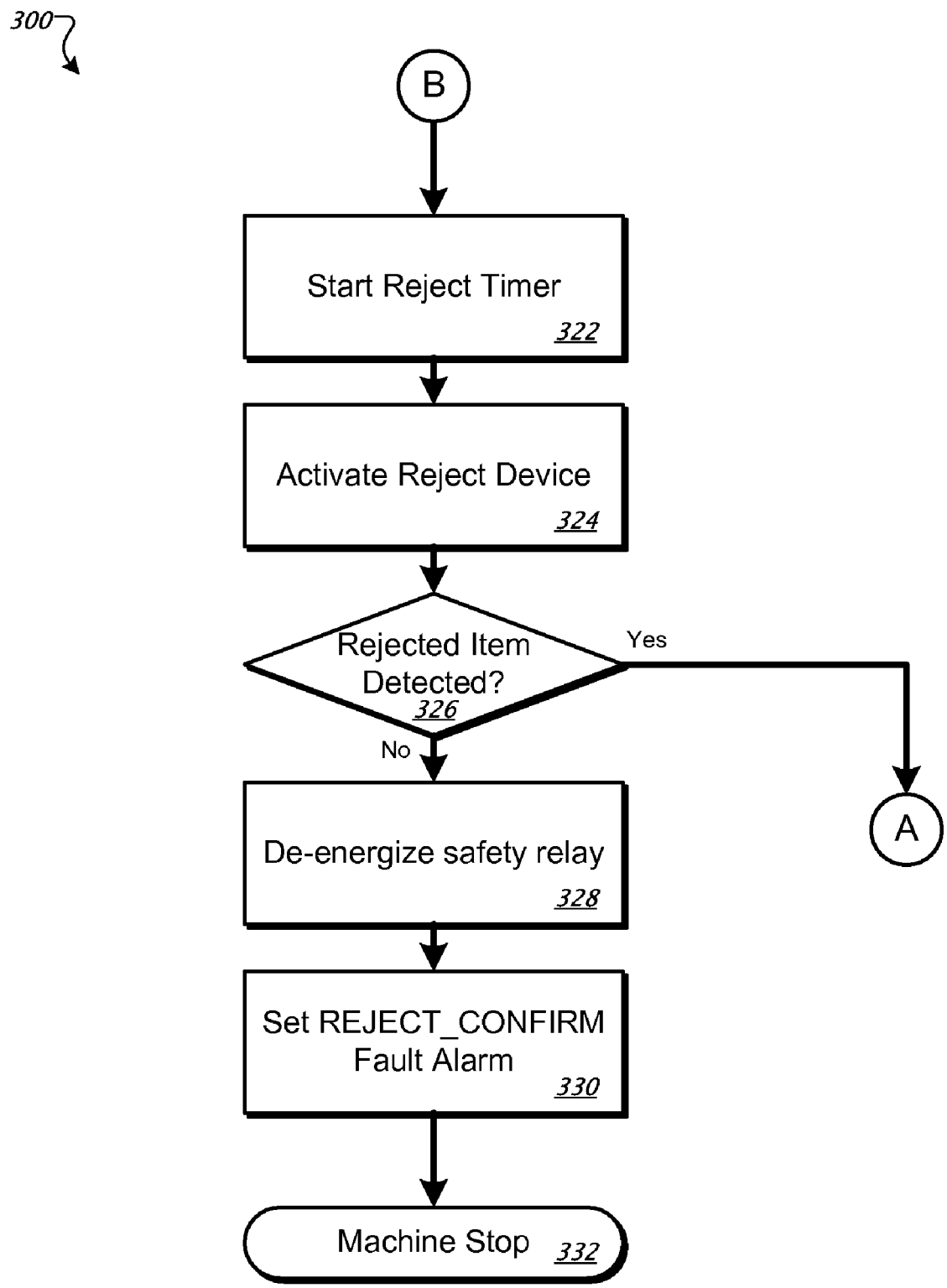

FIGS. 3A and 3B show an example fail-to-safe inspection process 300. The process 300 starts when a first sensor is activated (302) by an item (e.g., the item 110 of FIG. 1) travelling on a conveyor (e.g., the conveyor 105 of FIG. 1). In some embodiments, the first sensor may be the sensor 140 of FIG. 1.

In some embodiments, the first sensor may be activated when the item (e.g., the item 110 of FIG. 1) is within the sensing range of the sensor. For example, the first sensor 140 may be a vision inspection system that may self-trigger when an item is detected within the vision inspection system's field of view. In another example, the first sensor 140 may be a radio frequency identification (RFID) reader that continually polls for the presence of an RFID tag that may be included with the item. When the item and the included RFID tag come within range of the RFID reader, the RFID reader may detect the presence of the RFID tag and activate a reading process.

In some embodiments, the first sensor 140 may be activated by an external trigger. For example, the first sensor may be a barcode scanner that is triggered by a break-beam detector (e.g., the sensor 137 of FIG. 1), or similar device. When the item passes by the trigger device 137, an activation signal may be sent to activate the first sensor 140.

When the first sensor 140 is activated (302), a timer is started 304. When the item passes by a second sensor (e.g., the sensor 145 of FIG. 1), the second sensor is activated (306). In some embodiments, the first sensor 140 and the second sensor 145 may be the same type, make, model, and/or configuration of sensor device. In some embodiments, the first sensor's configuration may be copied to the second sensor 145 by connecting the sensors together.

Occasionally, the second sensor 145 may not be activated. For example, the second sensor 145 may develop a fault and be unable to be activated. In this example, the timer that was previously started (304) may time out when the first and second sensors 140-145 fail to activate within the timeout period. If a sensor timeout has been detected (308), then a SENSOR_FAIL state is set (310), and a machine stop operation is performed (312).

If no sensor timeout has been detected (308), then the sensor readings are compared (314) to verify that the sensor readings are the same. If the comparison (314) is not provided a readable code to compare, then a NO_READ state is set (316) to indicate that a readable code is not available.

If the comparison (314) determines that the readings are the same, then the sensor readings are compared (318) to verify that the sensors have read a match for the expected identity of the item. If the comparison (318) determines that a match has been made, then a MATCH state is set. The item is not rejected, and the process 300 waits for the first sensor to be activated (302).

In some implementations, the process 300 may include an operation to activate a fail-to-safe reject mechanism when a MATCH state is set (320). For example, the reject mechanism 160 of FIG. 1 may be configured to always divert items to the reject path 165 unless it is activated to allow an item to pass.

If the comparison (318) cannot determine a code, then the NO_READ state is set (316). When a NO_READ state is set (316), the item that caused the NO_READ state may be an allergenic item that should be rejected. The process 300 continues in FIG. 3B where a reject timer is started (322). A reject device (e.g., the diverter 160) is activated (324) to divert the item to the reject path (e.g., the reject path 165). In some implementations, the reject device 160 may be a fail-to-safe reject device that is normally set to reject items unless otherwise activated, and may not need to be activated (324) to direct the item to the reject path 165.

The process waits to receive a signal from a reject path sensor (e.g., the sensor 150 of FIG. 1). If the rejected item is detected (326) within a predetermined time measured by the reject timer, the item is determined to have been properly rejected and the process 300 continues by waiting for the first sensor 140 to be activated (302).

If the rejected item is not detected (326), then a safety relay is de-energized (328). In some embodiments, de-energizing (328) the safety relay may cause the conveyor 105 to stop. A REJECT_CONFIRM fault alarm is set (330) to alert a line operator. In some embodiments, the REJECT_CONFIRM fault alarm may trigger an audible and/or visual indicator, such as a semaphore (e.g., a light tree). A machine stop operation is then performed (332).

In some implementations, the REJECT_CONFIRM fault alarm and the subsequent machine stop operation (332) may be performed to prevent an allergenic item from being passed. For example, a REJECT_CONFIRM fault alarm may occur because an item that was expected to be rejected was not detected as being properly rejected. Therefore, a possibility exists that an allergenic item may still be on the conveyor 105. In this example, the conveyor 105 may be stopped to allow a line operator to remove items from the conveyor 105 to prevent a possibly allergenic item from passing.

In some implementations, a machine stop can be called using an independent safety relay channel A in parallel with an independent channel B of a relay circuit to drive an emergency stop circuit. As such, a fault signal can be received if an input does not reach the machine. For example, a relay with two independent channels may be connected to a machine stop output of a controller (e.g., the controller 155 of FIG 1) so the two independent channels may be energized when the line starts up. In this example, the independent channels may de-energize when the line stops. The independent channels may de-energize for a NO_READ state. If an outside event occurs, such as an electrical surge causing damage, the relay channel contacts may drop. In this example, the relay may trigger a machine shutdown even if one of the relay channels has malfunctioned (e.g., the contacts have welded).

In some implementations, a safety relay may provide feedback to a controller (e.g., the controller 155 of FIG. 1) by using two or more independent sets of contacts when energized. For example, the relay may be energized by an output of the controller to actuate a first set of contacts that close or open a circuit (e.g., a machine shutdown circuit, a diverter activation circuit). When energized, the relay also opens or closes a second set of contacts that are monitored by the controller to provide a signal that confirms the activation of the relay.

In some implementations, a safety relay may provide feedback to a controller (e.g., the controller 155 of FIG. 1) by using two or more relays in series. For example, the controller may activate a first relay to close or open a first circuit (e.g., a safety circuit, a reject mechanism activation circuit, an alarm circuit). The first circuit may be connected to energize or de-energize a second relay, and the second relay may be used to switch a feedback signal that may be monitored by the controller. The second relay may be monitored to confirm that the first circuit has been activated.

In some implementations, more than one output from a sensor can be determined. For example, one output can be used to trigger the sensor and another output can transmit a signal to trigger a code cycle counter. In some implementations, a trigger signal outside the sensor can be sent to the sensor and to trigger a code cycle counter.

The illustrated examples have given several descriptions of the system 100 of FIG. 1, the process 300 of FIG. 2, and the process 300 of FIGS. 3A and 3B, may be used for processing food-related items, other embodiments may exist. For example, the sensors 140 and 145 may be a pair of vision inspection systems, and the item 110 may be a blister pack of pills. The sensors 140 and 145 may inspect the blister pack to verify that the blister pack contains the correct number and type of pill. In another example, the item 110 may be a machined part, such as a bolt, and the sensors 140 and 145 may inspect the bolt to verify that the bolt is the correct length, diameter, and/or head size. In yet another example, the sensors 140 and 145 may be x-ray inspection systems configured to inspect cuts of meat for bone fragments, to inspect wine bottles for glass shards, or to inspect stuffed toys for needles that may have been lost in the toys' sewing process.

In some implementations, the process 200 may be used to sort packages in a shipping terminal. For example, a shipped package may have a barcode that contains the package's destination address and/or shipping zone. As the package travels down a conveyor, the package may pass a redundant pair of photo eyes. As the photo eyes sense the package, each photo eye may send a trigger signal to a controller, such as a programmable logic controller (PLC). When the controller receives the trigger signal from the first photo eye, the controller may start a timer to measure the amount of time between the arrival of the trigger signal and the second.

If the second trigger signal is not received within a predetermined period, such as 500 ms, the controller may determine that the second photo eye has malfunctioned and respond by setting a sensor failure alarm. In other examples, the controller may sense the second trigger signal without a preceding first trigger signal, determine that the first sensor has malfunctioned, and respond by setting a sensor failure alarm. The controller may respond to the receipt of one or both trigger signals by activating a barcode scanner. In other embodiments, signals from one or both of the photo eyes may be used to trigger the barcode scanner directly. The barcode scanner may be activated immediately, or after a period that allows the package to travel within the sensing range of the barcode scanner.

In some embodiments, the controller may set a SENSOR_FAIL state before activating the barcode scanner. If the barcode scanner does not return an identification signal within a timeout period, the SENSOR_FAIL state may remain active. The SENSOR_FAIL state may be used to trigger an alarm to alert line operators that the barcode scanner may have malfunctioned.

When activated, the barcode scanner may begin to scan for the destination barcode on the package to determine of the barcode matches a preconfigured criterion. For example, the barcode may include a shipping zone code, a ZIP code, country code, state code, or combinations of these or other information that may be used to sort and/or route shipped packages to the correct destination. In other examples, the barcode scanner may be configured to evaluate the information contained by the barcode, or to evaluate the quality of the barcode itself. For example, the barcode scanner may be configured to verify that the destination address includes a street address, a city, a state, and a ZIP code. In other examples, the barcode scanner may be configured to reject packages with smudged or otherwise damaged barcodes by rating the quality of the barcode itself. For example, a substantially ideal barcode may be scanned and given a score of "100", whereas a barcode that has been partly torn off may only be given a score of "40". If the barcode matches the preconfigured criterion, then a MATCH signal may be sent to the controller. If the barcode cannot be read, then a NO_READ signal may be sent to the controller.

In some embodiments, the barcode scanner may be configured to perform the evaluation of the scanned barcode and/or barcode information. In some embodiments, the barcode scanner may read the barcode and return the scanned barcode information to the controller for evaluation.

When the controller receives a signal from the barcode scanner, the SENSOR_FAIL state may end. If a MATCH signal is received, then the controller may set a MATCH state and may allow the package to continue on the conveyor. If a NO_READ signal is received, then the controller may set a NO_READ state and activate a reject mechanism to direct the package off the conveyor. If the barcode scanner does not return an identification signal within a timeout period, the SENSOR_FAIL state may remain active.

In some embodiments, the system 100 may include features to protect components of the system 100 from water, dust, humidity, or other substances that may damage the controller 155 and/or other components of the system 100. For example, the controller 155 may be housed in a NEMA 4X, IP65 sealed enclosure. The NEMA enclosure may include washdown-rated passthroughs for the sensors' 140-150 cables, power connections, data (e.g., serial, Ethernet, DeviceNet) connections, and/or other cables. An example of such passthroughs are "icotek" modular cable management systems commercially available from icotek GmbH, or Eschach, Germany.

What is claimed is:

1. A fail-to-safe fault detection system, comprising:
   a) a sensor system to monitor a container as said container moves along a continuous production line, said container having machine readable indicia thereon, wherein the sensor system comprises at least two first sensors to detect said container when said container moves along the production line past the sensor system, and at least one second sensor separate from the at least two first sensors and the sensor system activates the at least one second sensor based on the detection, the sensor system being operative to:
   read said indicia of said container when said container moves along the production line and past the at least one second sensor and compare data encoded therein with reference data stored in the sensor system or to apply an algorithm to the data encoded,
   determine whether the encoded data are associated with a match condition, said match condition reflecting that the encoded data is associated with predetermined properties or characteristics; in response to a match condition, determine a pass result; and
   otherwise determine a fail result;
   the sensor system having at least the following operating states:
   a first state in which the sensor system provides a first output associated with the pass result,
   a second state in which the sensor system provides a second output associated with the fail result, said second state being a default operating state; and
   a third state in which the sensor system provides a third output indicative of a failure or malfunction of at least one component of the sensor system; and
   b) a fail-to-safe controller to detect the third output and, in response thereto, transmit an alert signal to a production line control system, said production line control system being operative to start and stop the production line and to notify a line operator that the sensor system has failed or is malfunctioning.

2. The apparatus of claim 1, wherein a default output of the fail-to-safe controller is a signal to stop the production line.

3. The apparatus of claim 2, wherein the fail-to-safe controller generates a signal to stop the production line.

4. The apparatus of claim 2, wherein the fail-to-safe controller overrides the alert signal when the first output is detected.

5. The apparatus of claim 4, wherein the fail-to-safe controller assumes the third state if a buffer is not refreshed within a predetermined period of time.

6. The apparatus of claim 5, wherein the predetermined period of time is input by a user.

7. The apparatus of claim 5, wherein the sensor system provides a heartbeat signal to the fail-to-safe controller to trigger the controller to begin counting said predetermined period of time.

8. The apparatus of claim 7, wherein the sensor system provides an additional, redundant heartbeat signal to the fail-to-safe controller to ensure that the fail-to-safe controller begins counting the predetermined period of time.

9. The apparatus of claim 4, wherein a buffer provides data to the fail-to-safe controller that is indicative of the operating state.

10. The apparatus of claim 1, wherein a default setting of the production line control system is to stop the production line unless the fail-to-safe controller provides a signal to override the default setting.

11. The apparatus of claim 1, further comprising storing one of the outputs from the sensor system in a buffer in the fail-to-safe controller.

12. The apparatus of claim 1, wherein a reject signal is transmitted when the second state is detected.

13. The apparatus of claim 12, further comprising a reject confirmation sensor to detect whether rejected containers have been actually removed from a production path.

14. The apparatus of claim 13, wherein the fail-to-safe controller enters a fail-to-safe mode upon detection of said second state and remains in said fail-to-safe mode when an output of the reject confirmation sensor indicates that a rejected container has not been actually removed from the production path.

15. The apparatus of claim 1, wherein the machine readable indicia include a barcode.

16. The apparatus of claim 1, wherein the sensor system operating state enters or remains in the first state responsive to a match between the machine readable indicia and a stored code.

17. The apparatus of claim 1, wherein the sensor system operating state enters or remains in the first state responsive to a match between the machine readable indicia and a stored pattern of codes.

18. The apparatus of claim 1, wherein the fail-to-safe controller creates a log of events corresponding to instances in which the second and third states are detected.

19. The apparatus of claim 1, wherein each of the at least two first sensors is a photo-eye detector.

20. The apparatus of claim 19, wherein the sensor system operating state remains in the third state responsive to one of the at least two first sensors not being triggered.

21. The apparatus of claim 1, further comprising a conveyor moving continuously through the production line, wherein said conveyor moves said containers through the production line past and adjacent to the sensor system.

22. The system of claim 1, wherein the sensor system further comprises a fourth state in which the sensor system provides a fourth output indicative that the second sensor was unable to read said indicia of said container.

23. The system of claim 22, wherein the fail-to-safe controller, upon detecting the fourth output, sends a signal to cause removal of the container from the production line.

24. A method comprising:
a) entering, by a sensor system, a fail state, wherein a production line control system stops a production line associated with the sensor system if the sensor system remains in the fail state;
b) detecting, by at least two first sensors, a container positioned on a continuously moving conveyor in the production line, the container having machine readable indicia thereon, and each of the at least two first sensors being included in the sensor system;
c) activating, based on the detecting, a second sensor in the sensor system to read the indicia of the container as the container moves past and adjacent to the second sensor, the second sensor being separate from the at least two first sensors;
d) determining, by the sensor system, whether data encoded in the indicia of the container are associated with predetermined characteristics or properties;
e) identifying, in response to determining the data are associated with predetermined characteristics or properties, a pass result or a no match result;
f) entering, by the sensor system, a pass state upon identification of the pass result;
g) generating, in response to entering the pass state, a pass signal, wherein the production line control system allows the container to continue moving on the conveyor upon receiving the pass signal and does not cause the container to be removed from the production line;
h) re-entering, automatically by the sensor system, the fail state prior to detection of another container by one of the at least two sensors; and
i) repeating steps b through h for each container positioned on the continuously moving conveyor in the production line.

25. The method of claim 24, wherein the determining comprises comparing the data encoded in the indicia of the container with reference data stored in the sensor system to determine the pass result.

26. The method of claim 24, wherein the determining comprises applying an algorithm to the data encoded in the indicia of the container to determine the pass result.

27. The method of claim 24, further comprising remaining, by the sensor system, in the fail state if the second sensor does not respond to the activating.

28. The method of claim 27, further comprising stopping, by the production line control system, the production line based on the sensor system remaining in the fail state.

29. The method of claim 28, further comprising:
determining, by the sensor system, whether the second sensor reads the indicia of the container;
entering a reject container state if the second sensor responds to the activating and does not read the indicia of the container or upon identification of the no match result; and
generating a reject container signal associated with the reject container state, wherein the production line control system causes the removal of the container from the continuously moving conveyor upon receiving the reject container signal and does not stop the production line.

30. The method of claim 29, further comprising detecting, by a third sensor, the container to determine if the container was removed from the continuously moving conveyor.

31. The method of claim 29, further comprising stopping the production line when a third sensor does not detect that the container was removed from the continuously moving conveyor.

32. The method of claim 24, further comprising remaining, by the sensor system, in the fail state when the second sensor does not detect the container within a predetermined period of time after the at least two first sensors detect the container.

33. The method of claim 32, further comprising stopping, by the production line control system, the production line based on the sensor system remaining in the fail state.

* * * * *